United States Patent
Ali et al.

(10) Patent No.: US 9,912,539 B2
(45) Date of Patent: Mar. 6, 2018

(54) AMBIGUITY MEASUREMENT AND MANAGEMENT FOR CONFIGURATION ITEMS

(75) Inventors: Abed Ali, Hauppauge, NY (US); Peter McKay, Brooklyn, NY (US); John Michael Tomaszewski, Villa Park, IL (US)

(73) Assignee: CA, Inc., New York, NY (US)

( * ) Notice: Subject to any disclaimer, the term of this patent is extended or adjusted under 35 U.S.C. 154(b) by 1025 days.

(21) Appl. No.: 12/884,783

(22) Filed: Sep. 17, 2010

(65) Prior Publication Data

US 2012/0072551 A1 Mar. 22, 2012

(51) Int. Cl.
*G06F 15/177* (2006.01)
*H04L 12/24* (2006.01)

(52) U.S. Cl.
CPC ................ *H04L 41/0866* (2013.01)

(58) Field of Classification Search
CPC ...................................... H04L 41/08
See application file for complete search history.

(56) References Cited

U.S. PATENT DOCUMENTS

| | | | |
|---|---|---|---|
| 5,249,120 A * | 9/1993 | Foley | 705/1.1 |
| 5,806,066 A * | 9/1998 | Golshani et al. | |
| 5,950,171 A * | 9/1999 | Madell | 705/7.29 |
| 6,353,820 B1 * | 3/2002 | Edwards et al. | 707/696 |
| 6,601,061 B1 * | 7/2003 | Holt | G06F 17/30864 |
| 9,231,834 B2 | 1/2016 | Carmel | |
| 9,262,295 B2 | 2/2016 | Coley | |
| 9,477,494 B2 | 10/2016 | Waschke | |
| 9,501,564 B1 | 11/2016 | Waschke | |
| 2003/0140152 A1 * | 7/2003 | Creig Humes | 709/229 |
| 2006/0259442 A1 * | 11/2006 | Iqbal | 705/400 |
| 2008/0072285 A1 * | 3/2008 | Sankaran | H04L 63/0892 726/2 |
| 2009/0265455 A1 * | 10/2009 | Hiraki | H04L 61/2046 709/223 |

* cited by examiner

*Primary Examiner* — Siren Wei
(74) *Attorney, Agent, or Firm* — Pillsbury Winthrop Shaw Pittman LLP

(57) ABSTRACT

Systems and methods for measuring and managing ambiguity among a plurality of configuration items residing in a configuration management database include determining for at least a first configuration item, at least a second configuration item such that a first set of attributes associated with the first configuration item and a second set of attributes associated with the second configuration item have at least one attribute with an identical value. As an indicator for the ambiguity, an ambiguity index for the first configuration item may be measured. One of the first configuration item and the second configuration item may be identified as an ambiguous configuration item. Upon identification, an operational state of the ambiguous configuration item or a set of one or more attributes associated with the ambiguous configuration item may be modified. The ambiguity for configuration item transactions may likewise be measured and managed to locate and resolve transaction ambiguity.

27 Claims, 3 Drawing Sheets

AMBIGUITY MEASUREMENT AND MANAGEMENT FOR CONFIGURATION ITEMS

FIELD OF THE INVENTION

The invention generally relates to management of configuration items. More particularly, the invention relates to measuring and managing ambiguity in configuration items and transactions.

BACKGROUND OF THE INVENTION

In a configuration management system, multiple configuration items (CIs) representing business objects or services. A configuration item may be associated with one or more attributes of the business objects or services that it represents. There may be more than one CI representing a given business object in the system, such that different CIs representing the same object may have at least partially different sets of attributes.

The presence of such similarly-identified (i.e., those representing the same object) multiple CIs generates ambiguity in the configuration management system. For example, it may be difficult to determine if similarly-identified CIs refer to a same business object or different business objects. Also, there may be ambiguity related to transactions or updates directed to CIs, as it may be difficult to identify a correct CI among similarly-identified CIs to which a transaction or update should be applied.

Thus, it is desirable to manage and resolve ambiguity among CIs and CI transactions.

SUMMARY

In some implementations, the invention provides systems and methods for managing ambiguity among a plurality of configuration items or ambiguity related to a configuration item transaction. Systems and methods described herein provide mechanisms to resolve ambiguity among configuration items and configuration item transactions by identifying and modifying ambiguous configuration items.

Systems for managing ambiguity among a plurality of configuration items and ambiguity related to configuration item transactions may include an ambiguity management application, which may reside in or otherwise be operatively associated with a configuration management server. The ambiguity management application may be or include a computer application (or plurality of applications capable of communicating with one another) having one or more modules thereon, which when executed perform ambiguity management.

In some implementations, to manage ambiguity among a plurality of configuration items, the one or more modules may include instructions causing one or more processors to determine for at least a first configuration item associated with a first set of one or more attributes, one or more second (or candidate) configuration items each associated with a second set of one or more attributes, such that the first and second sets of attributes have at least one identical attribute (e.g., with an identical value). Attributes in the first and second sets of one or more attributes may include identifying attributes, for example, one or more of a configuration item name, a serial number, a MAC address, an IP address, a system name, an alternate asset ID, or a DNS name. In some implementations, the one or more processors may be configured to determine the second configuration item(s) periodically, or in response to an update of the first set of one or more attributes.

In some implementations, the presence of two or more configuration items sharing an identical attribute, e.g., the first and second configuration items, may indicate ambiguity among configuration items. For example, it may indicate that only one of the first and second configuration items is a valid configuration item and the other is ambiguous. Accordingly, as an indicator of the ambiguity, an ambiguity index for the first configuration item may be computed. In some implementations, the ambiguity index may be a function of a representative number associated with the one or more second configuration items. For example, the representative number may be the total number of the second configuration items, or may be equal to a weighted sum of the number of attributes, from each of the one or more second configuration items, with identical values. In some implementations, the second configuration items may be determine, and ambiguity index may be computed for a plurality of the first configuration items. To structurally manage the ambiguity in the system, the first configuration items may be sorted and arranged in a particular order, e.g., a decreasing order, of their respective ambiguity index values.

In some implementations, to manage ambiguity, one of the first configuration item and the one or more second configuration items may be identified as an ambiguous configuration item. In some implementations, to identify the ambiguous configuration item, the one or more processors may be configured to compare the first and second sets of one or more attributes on attribute-by-attribute basis. Alternatively, or in addition, the one or more processors may be configured to compare a "timeline of updates" performed on the first configuration item with a timeline of updates performed on the second configuration item. In some implementations, comparing a timeline of updates may refer to comparing attributes such as "last update date" to determine which CI is valid and which CIs are incorrectly created in an CI ambiguity set.

To resolve ambiguity, in some implementations, an operational state of an identified ambiguous configuration item may be modified. An operational state of an ambiguous configuration item may be modified by excluding the ambiguous configuration item from ambiguity management, deactivating the ambiguous configuration item, superseding the ambiguous configuration item, or using other modifications or actions. Excluding an ambiguous configuration item may include, for example, performing no further updates on the ambiguous configuration item. Superseding an ambiguous configuration item may include, for example, redirecting any update for the ambiguous configuration item to a superseding configuration item. In some implementations, a superseding configuration item may be any configuration item in the system other than the ambiguous configuration item, or may be a configuration item satisfying a user-defined criterion.

In some implementations, to resolve ambiguity, a set of one or more attributes associated with an ambiguous configuration item may be modified. In some implementations, modifying a set of one or more attributes associated with an ambiguous configuration item may include modifying a value of at least one attribute in the set of one or more attributes, adding a new attribute to the set of one or more attributes, or other modifications to attributes of an ambiguous configuration item. The one or more processors may be further configured to perform other features and/or functions.

In some implementations, the presence of two or more configuration items sharing an matching attribute (with an identical value) may generate ambiguity for a transaction (or instruction) directed to update or otherwise modify one of those configuration items, e.g., a target configuration item. Such two or more configuration items with a matching attribute may be defined as candidate configuration items. Accordingly, a configuration item transaction may be identified as ambiguous if the transaction (directed to the target configuration item) can be executed for and/or applied to more than one candidate configuration items. As an indicator of the magnitude of the ambiguity of the transaction, an ambiguity index for the transaction may be computed. In some implementation, the ambiguity index may be a function of the number of two or more candidate configuration items each having a matching attribute.

In some implementations, to manage ambiguity related to a configuration item transaction, the one or more modules of the ambiguity management application may include instructions causing one or more processors to receive a transaction for a target configuration item in a plurality of configuration items. Each of the plurality of configuration items, including the target configuration item, may be associated with a set of one or more attributes. The transaction may include update, insert, delete or other operations on data associated with the target configuration item.

In some implementations, the one or more processors may be configured to determine if there are at least two configuration items in the plurality of configuration items each having at least one attribute that is identical to an attribute of the target configuration item. Identical attributes may indicate, for example, that those attributes have identical value.

In some implementations, responsive to the determination of the at least two configuration items sharing an identical attribute with the target configuration item, the one or more processors may configured to identify one of the at least two configuration items as a valid target configuration item. Identification of a valid target configuration item may indicate the configuration item to which the transaction should be applied, thereby resolving ambiguity related to the transaction. In some implementations, a valid target configuration item may be selected by a user, e.g., based on attribute comparison or some other pre-defined criteria. In some implementations, to resolve ambiguity related to the transaction, the set of one or more attributes associated with the target configuration item may be modified. For example, modifying the set of one or more attributes associated with the target configuration item may include modifying a value of at least one attribute in the set of one or more attributes, adding a new attribute to the set of one or more attributes, or other modifications to attributes of an ambiguous configuration item.

In some implementations, the invention provides a method for managing ambiguity among a plurality of configuration items and ambiguity related to configuration item transactions. In some implementations, the invention may include a tangible computer readable storage media having computer or processor-executable instructions thereon, that when executed by one or more processing devices, may configure the one or more processing devices to perform one or more of the features and functions described herein.

These and other objects, features, and advantages of the invention will be apparent through the detailed description and the drawings attached hereto. It is also to be understood that both the foregoing general description and the following detailed description are exemplary and not restrictive of the scope of the invention.

DETAILED DESCRIPTION OF THE INVENTION

Figure 1:
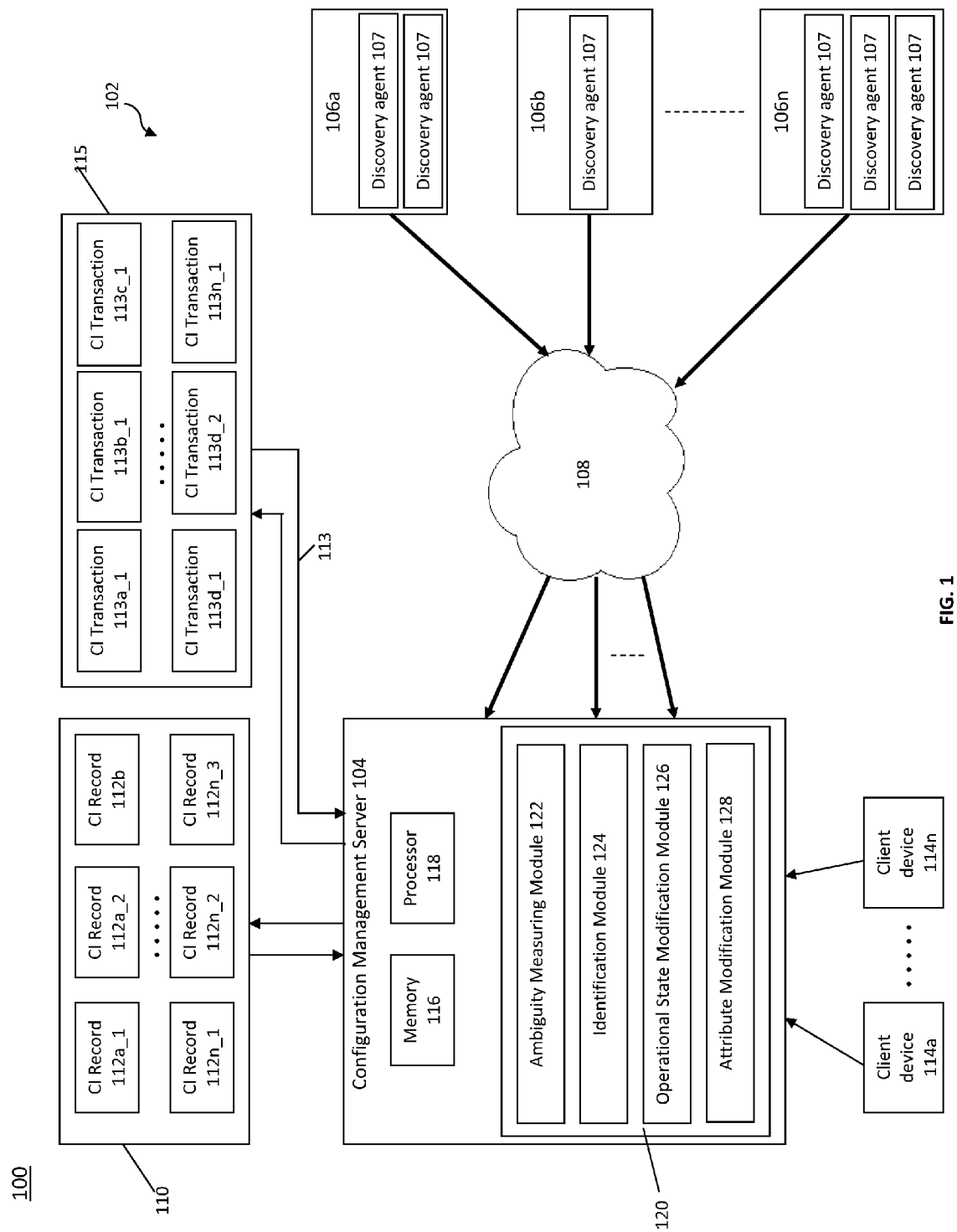
FIG. 1 illustrates an example of an environment that includes a configuration management system for managing ambiguity among configuration items, according to various implementations of the invention.

In some implementations, the invention provides systems and methods for managing ambiguity among configuration items and configuration item transactions. FIG. 1 illustrates an example of an environment 100 in which a system 102 for managing ambiguity, including identifying and resolving ambiguity among configuration items and transactions, resides. System 102 may include at least one configuration management server 104 that manages configuration for one or more business objects or resources 106a, 106b, . . . , 106n, e.g., in an enterprise. In some implementations, configuration management server 104 may be communicatively coupled with business objects 106 to receive configuration changes or updates related to the respective business objects 106. Configuration management server 104 and business objects may be connected directly or through a network 108.

Business objects 106 may include, but not be limited to, hardware, software, services, users, business units, service level agreements, organizations, and/or other objects/resources associated with an enterprise. Each business object 106 may include and run one or more discovery agents 107 that discover/gather the appropriate configuration data, and send the gathered data to configuration management server 104. The attributes of a business object 106 which are to be tracked and for which data is to be gathered may be pre-determined, for example, determined at design time. In some implementations, if a business object 106 includes multiple discovery agents 107, each discovery agent 107 may discover and store an at least partially different set of attributes of business object 106. Accordingly, discovery agents 107 may send update messages to configuration management server 104 only concerning attributes in the associated set of attributes. While FIG. 1 depicts discovery agents 107 running on business objects 106, one of ordinary skill in the art would recognize that discovery agents or other similar discovery tools may run on configuration management server 104, and in some cases run in a distributed fashion on configuration management server 104 and business object 106.

In some implementation, business objects 106 may be represented as and managed by configuration management server 104 as configuration items (CIs). A configuration item may be associated with one or more attributes of the corresponding business object 106. In some implementations, attributes (and their respective values) of a configuration item define a complete state of the configuration item at a given point in time. Information regarding configuration items, which may include, but are not limited to, information regarding the attributes associated with the configuration items and relationships between CIs may be stored in a database 110 operatively connected with configuration management server 104. In some implementations, database 110 may comprise a configuration management database (CMDB), though the implementation of this invention is not limited to a specific type of database as long as the database stores the information regarding configuration items. In some implementations, information related to attributes and/or relationships of a CI may be stored in database 110 as a CI record 112. CI record 112 for a CI may be created and/or updated by configuration management server 104 according to configuration data received from the corresponding business object 106. In some implementations, for each business object 106, one or more CI records 112 may be created and stored in database 110. For example, as shown in FIG. 1, CI records 112a_1 and 112a_2 may correspond to a CI representing business object 106a. Different CI records 112 corresponding to a same business object 106 may be associated with completely or partially different sets of attributes associated with the same business object 106. These different sets of attributes may be discovered, e.g., by different discovery agents 107 residing in (or otherwise operatively associated with) the associated business object 106.

In some implementations, the presence of multiple CI records 112 for a given business object 106 in database 110 may generate ambiguity among CI records 112. Such ambiguity may be undesirable in system 102. For example, a message related to a change in a particular business object 106, e.g., a CI transaction 113 from a transaction work area (TWA) 115, may be received at configuration management server 104, and sent to database 110 to update a CI record 112. However, at database 110, CI transaction 113 may be executed to select and update an incorrect CI record 112 among a group of CI records 112 which corresponds to that particular business object 106. Such a case, in which there are multiple CI records 112 as potential target CI records 112 for configuration management server 104 to update or change, reflects ambiguity in a CI transaction 113. In some implementations, if CI transaction 113 is executed or performed on an incorrect CI record 112, it is known as false positive matching.

In some implementations, based on the attribute(s) which are to be updated using CI transaction 113, configuration management server 104 may fail to identify a relevant CI record 112, and erroneously conclude that a CI record 112 including the to-be-updated attribute(s) does not exist in database 110. Accordingly, a CI transaction 113 to create a new CI record 112 may be sent to database, which may essentially duplicate an existing CI record 112. Such incorrect creation of new CI records 112 is known as false negative matching. These falsely-created CI records 112 may increase the ambiguity among CI records 112 in system 102, and may further facilitate the increase of ambiguity by participating in future false positive matches. The ambiguity among CI records 112 and/or CI transactions 113 may be resolved using one or more techniques or methods described herein.

The attributes of a CI stored, for example, in a CI record 112 may include, but not be limited to, type of configuration item, install date, license information, location, name, manufacturer, release information, MAC address, IP address, status, vendor information, component information, acquire date, category, model name, lease information, relationship with other CIs, and/or other attributes that define the configuration item. For example, attributes associated with a CI representing a server in system 102 may include component attributes such as disk space, memory, processor type, and/or other attributes. Relationship attributes may define directional relationships between CIs. Relationship attributes may define various relationship types, for example, provider to dependent, dependent to provider, peer-to-peer, and/or other relationship types. Relationships between CIs may include, is approved by, is authorized by, is owned by, connects to, is contained by, is controlled by, is hosted by, is used by, monitors, and/or other relationships. Due to ambiguity in system 102, CI records 112 may be updated using, e.g., CI transaction 113 such that erroneous and/or undesired relationships are created between two or more CI records 112, thereby incorrectly modifying the relationship attributes of those CI records 112.

Administrators (or other users) may interact with the configuration management server 104 via one or more client devices 114a, . . . , 114n. Client devices 114a, . . . , 114n may each comprise a user interface module (not shown) that may enable users to perform various operations that may facilitate interaction with configuration management server 104 including, for example, managing/accessing CI records 112, providing requests for one or more states of configuration items, receiving/providing information (for example, configuration related information or other information) associated with configuration items, and/or performing other operations. Client devices 114a, . . . , 114n may include a processor (not shown), circuitry, and/or other hardware operable to execute computer-readable instructions.

In some implementations, configuration management server 104, business objects 106, database 110 and client devices 114 may be connected with each other directly or via network 108. Network 108 may include the Internet and/or other networks. It will be appreciated that this is not intended to be limiting, and that the scope of this disclosure includes implementations in which configuration management server 104, business objects 106, database 110 and client devices 114 are operatively linked via some other communication methodology. In some implementations, environment 100 may include one or more elements other than configuration management server 104, business objects 106, database 110 and client devices 114 (not shown). These other elements may include one or more servers, desktops, laptops, workstations, wireless devices (e.g., smartphones, personal digital assistants, etc.), routers, switches, and/or other network or other devices.

In some implementations, configuration management server 104 may include a memory 116. Although memory 116 is depicted as a single unit in server 104, they may be two or more memories 116 or other storage units. Memory 116 may comprise electronic storage media that electronically stores information. Such electronic storage media may be provided integrally (i.e., substantially non-removable) to server 104 and/or as removable storage that is removably connectable to server 104 via, for example, a port (e.g., a USB port, a firewire port, etc.) or a drive (e.g., a disk drive, etc.). Memory 116 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Memory 116 may store messages related to change or update of data or attributes in business objects 106, software algorithms, and/or other information that enables configuration management server 104 to function as described herein.

In some implementations, configuration management server 104 may include a processor 118 may be configured to provide information processing capabilities in server 104. As such, processor 118 may include one or more of a digital processor, an analog processor, a digital circuit designed to process information, an analog circuit designed to process information, a state machine, and/or other mechanisms for electronically processing information. Although processor 118 is shown in FIG. 1 as a single entity, this is for illustrative purposes only. In some implementations, processor 118 may include a plurality of processing units. These processing units may be physically located within the same device or computing platform, or processor 118 may represent processing functionality of a plurality of devices operating in coordination.

In some implementations, configuration management server 104 may run or operate an ambiguity management application 120 for resolving ambiguity among configuration items or records thereof (i.e., CI records 112) and/or ambiguity related to CI transactions 113. Ambiguity management application 120 may be or may include a computer application (or plurality of applications capable of communicating with one another) having one or more modules including an ambiguity measuring module 122, an identification module 124, an operational state modification (OSM) module 126, and an attribute modification (AM) module 128. In some implementations, the modules of ambiguity management application 120 may include computer executable instructions embodied on computer readable storage media, e.g., memory 116. These computer executable instructions may be used to configure processor 118 of configuration management server 104 for performing one or more features and functions, including those disclosed herein and/or other features and functions. In some implementations, ambiguity management application 120 modules may be implemented across multiple applications and/or devices within environment 100 to perform the data replication features and functions described herein.

It should be appreciated that although modules 122, 124, 126 and 128 are illustrated in FIG. 1 as being co-located with a single processing unit, in implementations in which processor 118 includes multiple processing units, one or more of modules 122, 124, 126 and/or 128 may be located remotely from the other modules. The description of the functionality provided by the different modules, i.e., modules 122, 124, 126 and/or 128 described below is for illustrative purposes, and is not intended to be limiting, as any of modules 122, 124, 126 and/or 128 may provide more or less functionality than is described. For example, one or more of modules 122, 124, 126 and/or 128 may be eliminated, and some or all of its functionality may be provided by other ones of modules 122, 124, 126 and/or 128. As another example, processor 118 may be configured to execute one or more additional modules that may perform some or all of the functionality attributed below to one of modules 122, 124, 126 and/or 128.

In some implementations, one or more components (e.g., components 116 and 118) and/or modules (e.g., 122, 124, 126 and 128) of configuration management server 104 may reside on one or more computing elements (e.g., servers or other machines) separate from but otherwise connected to configuration management server 104.

Ambiguity Among CIs or CI Records

As discussed above, there may be more than one CI record 112 in database 110 for a configuration item (representing a given business object 106). These multiple CI records 112 may store at least partially different sets of CI attributes of the corresponding CI. Multiple CI records 112 for a same CI may generate ambiguity among CIs, which may further result in updating incorrect CI records 112. Accordingly, it is preferred to identify and resolve ambiguous CIs and CI records, so that only one CI record 112 exists in the database for a given CI or business object 106.

In some implementations, ambiguity measuring module 122 may be configured to measure ambiguity for every CI record 112 in database 110. In some implementations, the ambiguity may be measured and represented using an indicator called ambiguity index. The ambiguity index for a CI record 112 may be defined as an operational measure of the potential nonuniqueness of a CI record 112 or a CI transaction 113 directed to a CI record 112, based on the attributes related to the CI record 112 or CI transaction 113, respectively. In other words, the ambiguity index for a particular CI record 112 may indicate a likelihood that the CI record 112 was incorrectly created in database 110 by server 104, and should not have existed in database 110 in the first place. Similarly, for CI transactions, the ambiguity index for a particular CI transaction 113 may indicate the probability that the CI transaction 113 is directed to a single target CI record 112 (as intended), or to multiple potential CI records 112. The ambiguity measuring module 122 may be configured to calculate ambiguity index for a CI record 112 by, for example, determining, for that CI record 112, the approximate number of existing CI records 112 in database 110 that match on any of the attributes associated with that CI record 112. Alternatively, the ambiguity index for a CI record 112 may be computed as equal to a weighted sum of the number of attributes, from each of the matching CI records 112, which an identical value as the attribute of the CI record 112 being examined. In other words, the ambiguity index for a particular CI record 112 provides an indicator for the approximate number of other CI records 112 present in database 110 that have or are associated with at least one attribute which is identical to an attribute of that particular CI record 112. In some implementations, determining if an attribute of a CI or CI record 112 is identical to an attribute of another CI or CI record 112 may include determining if their respective attribute values are identical or equal. For a candidate CI record 112, CI records 112 which are determined as ambiguous with the candidate CI record 112 may be represented as in an ambiguity set for the candidate CI record 112. In some implementations, the greater the ambiguity index for a CI record 112, the higher is the probability that the CI record 112 was created inconsistently and there may be additional CI records 112 representing the same CI or business object 106 (that were incorrectly created in database 110). The ambiguity index may be equal to zero for non-ambiguous unique CI records 112. In some implementations, ambiguous sets and ambiguity index values may be determined for a plurality of candidate CI records 112. Accordingly, to structurally manage the ambiguity of those CI records 112, the candidate CI records 112 may be sorted and arranged in a particular order, e.g., a decreasing order, of their respective ambiguity index values.

Following is an example of calculation of ambiguity indices by ambiguity measuring module 122 for CI records 112 in database 110. For example, there are the following four CI records 112 residing in database 110 storing various attributes, e.g., name, DNS name, serial number and MAC address (with their values in parentheses), for their respective CIs:

CI record 112_1: Name (Server 1), DNS Name (dns1), Serial Number (serial 1)

CI record 112_2: Name (Server 1), DNS Name (dns1)

CI record 112_3: Name (Server 2), DNS Name (dns1), Serial Number (serial 1)

CI record 112_4: Name (Server 3), MAC Address (mac 1)

For the above example, assuming module 122 calculates the ambiguity index for CI records 112 in the order in which they are listed above, following is the ambiguity index calculation and results thereof:

(a) For CI record 112_1:
Count of other CI records 112 with identical Name attribute, Count 1=1
Count of other CI records 112 with identical DNS Name attribute, Count 2=2
Count of other CI records 112 with identical Serial Number attribute, Count 3=1
Ambiguity Index for CI record 112_1=Count 1+Count 2+Count 3=1+2+1=4
Ambiguity Set for CI record 112_1: {CI record 112_2, CI record 112_3}

(b) For CI record 112_2:
Count of other CI records 112 with identical Name attribute, Count 1=1
Count of other CI records 112 with identical DNS Name attribute, Count 2=2
Ambiguity Index for CI record 112_2=Count 1+Count 2=1+2=3
Ambiguity Set for CI record 112_2: {CI record 112_1, CI record 112_3}

(c) For CI record 112_3:
Count of other CI records 112 with identical Name attribute, Count 1=0
Count of other CI records 112 with identical DNS Name attribute, Count 2=2
Count of other CI records 112 with identical Serial Number attribute, Count 3=1
Ambiguity Index for CI record 112_3=Count 1+Count 2+Count 3=0+2+1=3
Ambiguity Set for CI record 112_3: {CI record 112_1, CI record 112_2}

(d) For CI record 112_4:
Count of other CI records 112 with identical Name attribute, Count 1=0
Count of other CI records 112 with identical MAC Address attribute, Count 4=0
Ambiguity Index for CI record 112_4=Count 1+Count 4=0+0=0
Ambiguity Set for CI record 112_4: { } (empty set)

Accordingly, based on matching attributes CI record 112_1 has the highest ambiguity index (equal to 4) and CI record 112_4 has the lowest ambiguity (equal to zero, i.e., CI record 112_4 is unambiguous). In some implementations, ambiguity measuring module 122 may be configured to calculate ambiguity index for existing CI records 112 periodically, e.g., according to a period set by a user, at command of a user by an instruction provided via client device 114 or directly at server 104, or after an update is performed on the attributes associated with CI records 112.

In some implementations, identification module 124 may be configured to identify, for each candidate CI record 112 with a non-zero ambiguity index (e.g., CI records 112_1, 112_2 and 112_3 in the above example), one or more CI records as "ambiguous" (i.e., falsely-created) among the CI records 112 in the ambiguity set of the candidate CI record 112 and the candidate CI record 112 itself. The identification of ambiguous CI records may be utilized further by other modules in configuration management server 104, e.g., OSM module 126 or AM module 128, to resolve ambiguity in among CI records 112. For such identification, for example, identification module 124 may be configured to perform an attribute-by-attribute comparison between the candidate CI record 112 and each CI record 112 in its ambiguity set. In some implementations, one or more attributes being compared may have higher priority or significance than other attributes. For example, in some implementations, one or more attributes may be assigned a "high" value to help identify ambiguities that are tied to a particular characteristic of a CI that may be valid to have the same value. Alternately, one or more attributes may be assigned a "low" value to allow CIs to have identical identifying attributes. For example, in some implementations, one or more attributes may also be assigned a multiplier to help locate CIs in systems where ambiguity may cause severe data corruption. Additionally, or alternatively, a low or zero multiplier may be used to ignore ambiguity in the CI attributes in system where ambiguity may not cause extensive data corruption, or where duplication of the attribute value is allowed across many CIs. In some implementations, identification module 124 may be configured to compare timelines of updates or changes to the candidate CI record 112 and that of each CI record 112 in its ambiguity set.

In some implementations, CI records 112 and their respective ambiguity sets may be displayed by a display module (not shown) on a graphical user interface (GUI) on a display of configuration management server 104. For example, CI records 112 (and their ambiguity sets) may be displayed on a monitor attached with server 104 in a descending or ascending order of their calculated ambiguity index values. Alternatively, CI records 112 may be displayed in a random order. In some implementations, in addition to (or as an alternative to) the functions performed by identification module 124, a user may access the displayed CI records 112 by being present at the location of configuration management server 104, or remotely, e.g., through network 108. The user may then be able to utilize the displayed CI records 112 by manually inspecting the CI records, and performing the attribute and/or the timeline comparisons as discussed above. Based on such comparisons, the user may be able to identify one or more ambiguous CI records for each CI record 112 (having non-zero ambiguity index).

In some implementations, using information generated by identification module 124, operational state modification (OSM) module 126 or attribute modification (AM) module 128 (or both) may be used to resolve ambiguity among CI records 112 in database 110. In some implementations, OSM module 126 may be configured to change the operational state of the ambiguous CI records identified for (and associated with) each CI record 112. Such change in operational state of the ambiguous CI records may result in resolving ambiguity for the associated CI record 112, thereby correctly identifying only one CI record corresponding to a CI or business object 106.

In some implementations, it may be determined that a CI record 112 with non-zero ambiguity index (i.e., an ambiguous CI record) represents a known and valid ambiguity in the system. In such a case, OSM module 126 may be configured to change the operational state of a CI record by excluding (or tagging as "excluded") the ambiguous CI record from any ambiguity management function performed by ambiguity management application 120. For example, after being excluded from ambiguity management, that CI record 112 may not be included in any future ambiguity index calculation (by ambiguity measuring module 122).

In some implementations, it may be determined that an ambiguous CI record is (consistently or inconsistently) being updated by transactions 113 or update messages sent from discovery agents 107. Such transactions performed on the ambiguous CI record may cause data corruption in database 110. Accordingly, OSM module 126 may be configured to change the operational state of such ambiguous CI record by deactivating (or logically deleting) the ambiguous CI such that no update is received for or applied on the ambiguous record.

In some implementations, updates or transactions directed to ambiguous CI records in database 110 may not be deactivated, or otherwise be in control of an administrator. However, those updates may still cause data corruption and further ambiguity in database 110. Accordingly, to tackle these uncontrolled updates to ambiguous CI records, OSM module 126 may be configured to change the operational state of an ambiguous CI record by "superseding" the ambiguous CI record. In some implementations, superseding an ambiguous CI record may include identifying any one of the CI records 112 in database 110 (except the ambiguous configuration item itself) as a superseding CI record and redirecting any or all transactions directed to the ambiguous (and superseded) CI record to the superseding CI record. The redirected transactions are then applied to the superseding CI record. In some implementations, factors that are considered for selecting superseding CI record may include reviewing attributes of a candidate superseding CI record, such as update timeline (e.g., last update date and time), creation time, etc. Once an ambiguous CI record is being superseded, it may not receive any further updates from server 104, and otherwise may be deactivated in database 110.

To resolve ambiguity, in addition to (or as an alternative to) the functions performed by OSM module 126, AM module 128 may be configured to modify the set of one or more attributes associated with an ambiguous CI record. In some implementations, modifying the set of attributes of an ambiguous CI record may include one or both of modifying a value of at least one attribute in the set of attributes, or adding a new attribute to the set of one or more attributes.

As discussed above, CI records 112 and their respective ambiguity sets may be displayed on a graphical user interface (GUI) on a display of configuration management server 104 accessible by a user locally or remotely (e.g., through internet access). In some implementations, in addition to (or as an alternative to) the functions performed by OSM module 126 and AM module 128, a user may manually change the operational state of an ambiguous CI record and/or modify an attribute set of an ambiguous CI record.

In some implementations, during the above-described ambiguity management of the CI records 112, processing of all incoming CI transactions received at database 110 may be suspended until the ambiguity among CI records 112 is resolved.

Figure 2:
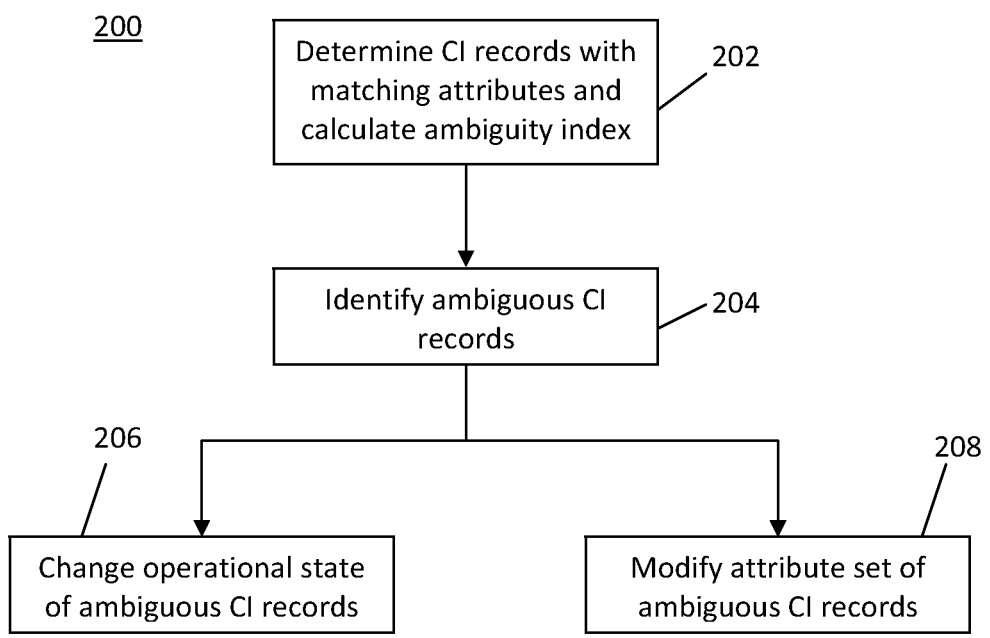
FIG. 2 illustrates an example of a method for managing ambiguity among a plurality of configuration items, according to various implementations of the invention.

In some implementations, the invention provides a method for managing ambiguity among CI records (e.g., CI records 112 representing CIs or business objects 106) residing in a database (e.g., database 110). FIG. 2 illustrates a process 200, which is an example of a process for managing ambiguity among CI records 112. In some implementations, process 200 may be performed by one or more processors configured by computer executable instructions for performing a plurality of operations (e.g., the operations of process 200).

Process 200 includes an operation 202, in which ambiguity measuring module 122 may be invoked to determine for each candidate CI or CI record (e.g., CI record 112) in a plurality of CIs or CI records, e.g., in database 110, one or more CIs or CI records such that one or more attributes associated with the candidate CI record 112 and the one or more CI records 112 are similar, e.g., some attribute(s) have identical or equal value. As discussed above, ambiguity measuring module 122 may utilize this identification information to calculate ambiguity index for each CI record 112. In some implementations, the ambiguity index values may be used by other modules in application 120 to resolve ambiguity in database 110.

Following operation 202, the rest of process 200 may be performed for each CI record 112 in a descending or ascending order of ambiguity index values for CI records 112. For example, taking the descending order and starting with the CI record with the highest ambiguity index, in an operation 204, identification module 124 may be invoked to identify one or more CI records as "ambiguous" (i.e., falsely-created) among the CI records 112 in the ambiguity set of the candidate CI record 112 and the candidate CI record 112 itself. For such identification, for example, identification module 124 may be configured to perform an attribute-by-attribute comparison between the candidate CI record 112 and each CI record 112 in its ambiguity set. Additionally, or alternatively, identification module 124 may be configured to compare timelines of updates or changes to the candidate CI record 112 and that of each CI record 112 in its ambiguity set.

In operations 206, 208, using information generated by identification module 124, operational state modification (OSM) module 126 or attribute modification (AM) module 128 (or both) may be used to resolve ambiguity among CI records 112. In some implementations, in operation 206, OSM module 126 may be invoked to change the operational state of the ambiguous CI records identified for (and associated with) each CI record 112. In some implementations, modifying an operational state of the ambiguous configuration item includes excluding the ambiguous CI record from ambiguity management, wherein the ambiguous CI record may be known to have a valid (or desired) ambiguity. Operational state modification may further include deactivating the ambiguous CI record such that no update may be performed on the ambiguous CI record, and/or superseding the ambiguous CI record such that any update for the ambiguous CI record may be redirected to a superseding CI record. The superseding CI record may be any one of the plurality of CI records except the ambiguous CI record.

In an operation 208, AM module 128 may be invoked to modify an operational state of the ambiguous CI record, modify a set of one or more attributes associated with the ambiguous CI record, or both. In some implementations, modifying the set of attributes of an ambiguous CI record may include one or both of modifying a value of at least one attribute in the set of attributes, or adding a new attribute to the set of one or more attributes.

In some implementations, Ambiguity Measuring Module 122 may be configured to distribute notifications to all interested parties of the ambiguous CI based on CI selection criteria including, but not limited to, CI identifying attributes or information related to CI ownership.

Ambiguity Related to CI Transactions

In some implementations, apart from ambiguous CI records in database 110, transactions directed to CI records 112 to update them may also be ambiguous. In other words, instead of being targeted to (and therefore, updating) a single unique CI record, a transaction may have multiple target CI records 112 (e.g., based on one or more matching identifying attribute), thereby making the transaction ambiguous. Accordingly, it is preferable to resolve ambiguity related to a transaction to ensure that only a correct CI record is being updated by the transaction.

In some implementations, database 110 may receive a transaction 113 from discovery agent 107, e.g., through transaction work area 115. Transaction 113 may include information regarding CI record 112 to which it is targeted (i.e., a target CI record), attributes associated with target CI record 112, and operations to be performed on one or more attributes of target CI record 112. The transaction operations may include update, insert, or delete operations.

Referring back to FIG. 1, in some implementations, ambiguity measuring module 122 may be configured to measure ambiguity for an incoming CI transaction 113. The ambiguity related to a CI transaction may be measured and represented using the ambiguity index indicator. As discussed above, the ambiguity index for a CI transaction 113 may be defined as an operational measure of the potential nonuniqueness of the CI transaction 113, based on the attributes related to CI transaction 113. In other words, the ambiguity index for a particular CI transaction 113 may indicate a likelihood that CI transaction 113 has more than one possible target CI record 112. Ambiguity measuring module 122 may be configured to calculate ambiguity index for a CI transaction 113 by, for example, determining, for that CI transaction 113, the approximate number of CI records 112 (at least two) in database 110 that match on any of the attributes associated with that CI transaction 113. In other words, the ambiguity index for a particular CI transaction 113 provides an indicator for the approximate number of other CI records 112 present in database 110 that have or are associated with at least one attribute which is identical to an attribute of that particular CI transaction 113. In some implementations, determining if an attribute associated with a CI transaction is identical to an attribute of a CI record 112 may include determining if their respective attribute values are identical or equal. For a CI transaction 113, CI records 112 which are determined as potential targets CI records may be represented as in an ambiguity set of the CI transaction 113. In some implementations, the greater the ambiguity index for a CI transaction 113, the higher is the probability that the CI transaction 113 would be applied to an incorrect CI record 112, thereby causing data corruption in database 110. The ambiguity index may be equal to zero for CI transactions 113 that have only one target CI record 112.

Following is an example of calculation of ambiguity indices by ambiguity measuring module 122 for CI transaction 113. In this example, although there are two CI transactions 113 received by database 110 and two CI records 112 residing in database 110, there may be any number of transactions and/or CI records. The transactions and CI records may include various attributes, e.g., name, DNS name, serial number and MAC address as shown below (with their values in parentheses):

CI Transactions

CI transaction 113_1: Name (Server 1), DNS Name (dns1), Serial Number (serial 1)

CI transaction 113_2: Name (Server 2), DNS Name (dns1), Serial Number (serial 1)

CI Records

CI record 112_1: Name (Server 1), DNS Name (dns1), Serial Number (serial 1)

CI record 112_2: Name (Server 2), DNS Name (dns1), Serial Number (serial 1), MAC Address (mac 1)

As can be seen, for CI transaction 113_1, there is only one CI record, i.e., CI record 112_1 that matches on all attributes of CI transaction 113_1. Therefore, ambiguity index for CI transaction 113_1 is equal to zero, i.e., CI transaction 113_1 is not ambiguous. Accordingly, in some implementations, ambiguity set for CI transaction 113_1 may be an empty set.

For CI transaction 113_2, however, there is only one CI record, i.e., CI record 112_2 that matches on Name attribute with CI transaction 113_1 but both CI records (112_1 and 112_2) match on two attributes, i.e., DNS Name and Serial Number. Accordingly, ambiguity measuring module 122 may determine CI transaction 113_2 as ambiguous with an ambiguity index for CI transaction 113_2 being equal to two. In some implementations, ambiguity set for CI transaction 113_2 may include CI record 112_1 and record 112_2. In general, the ambiguity index of a CI transaction (e.g., CI transaction 113_2) may be a function of a representative number associated with the two or more candidate configuration items (e.g., CI record 112_1 and CI record 112_2). In some implementations, the representative number may be either equal to a weighted sum of counts, each minus one, of the candidate configuration items, wherein a count is determined for each of the one or more matching attributes (e.g., Name, DNS Name, etc.), or may be equal to a total number of the candidate configuration items minus one.

In some implementations, identification module 124 may be configured to identify a valid target CI record from the ambiguity set of a CI transaction for which the CI transaction is actually intended. For example, for CI transaction 113_2 discussed above, identification module 124 may be configured to identify a valid target CI record to be updated from CI records 112_1 and 112_2. In this example, transaction 113_2 may be applied to the valid target CI record for updating the CI record as per the operations associated with transaction 113_2.

In some implementations, in addition to (or as an alternative to) the functions performed by identification module 124, AM module 128 may be configured to modify the set of one or more attributes associated with the target CI record specified in the ambiguous CI transaction (e.g., CI transaction 113_2 in the above example). In some implementations, modifying the set of attributes associated with the ambiguous CI transaction may include one or both of modifying a value of at least one attribute in the set of attributes, or adding a new attribute to the set of one or more attributes. These modifications may clarify and resolve the ambiguity in CI transaction 113 such that the correct target CI record for the CI transaction is clearly identifiable.

In some implementations, identification module 124 may be configured to determine if an attribute in a candidate CI transaction 113 or in any CI transaction in its ambiguity set have a unique value, e.g., equal to a Global Unique Identifier (GUID). The presence of an attribute with GUID value may indicate that the CI transaction is not ambiguous, and therefore can be excluded from the ambiguous-CI transaction identification process. In some implementations, if a CI transaction 113 is found to have an attribute with GUID value, its ambiguity index may be set to zero (irrespective of the calculated ambiguity index) to exclude it from any comparison performed by identification module 124.

In some implementations, ambiguous CI transactions 113 and their respective ambiguity sets may be displayed on a graphical user interface (GUI) on a display of configuration management server 104 accessible by a user locally or remotely (e.g., through internet access). In some implementations, in addition to (or as an alternative to) the functions performed by identification module 124 and AM module 128, a user may manually identify a valid target CI record and/or modify an attribute set of an ambiguous CI transaction.

Figure 3:
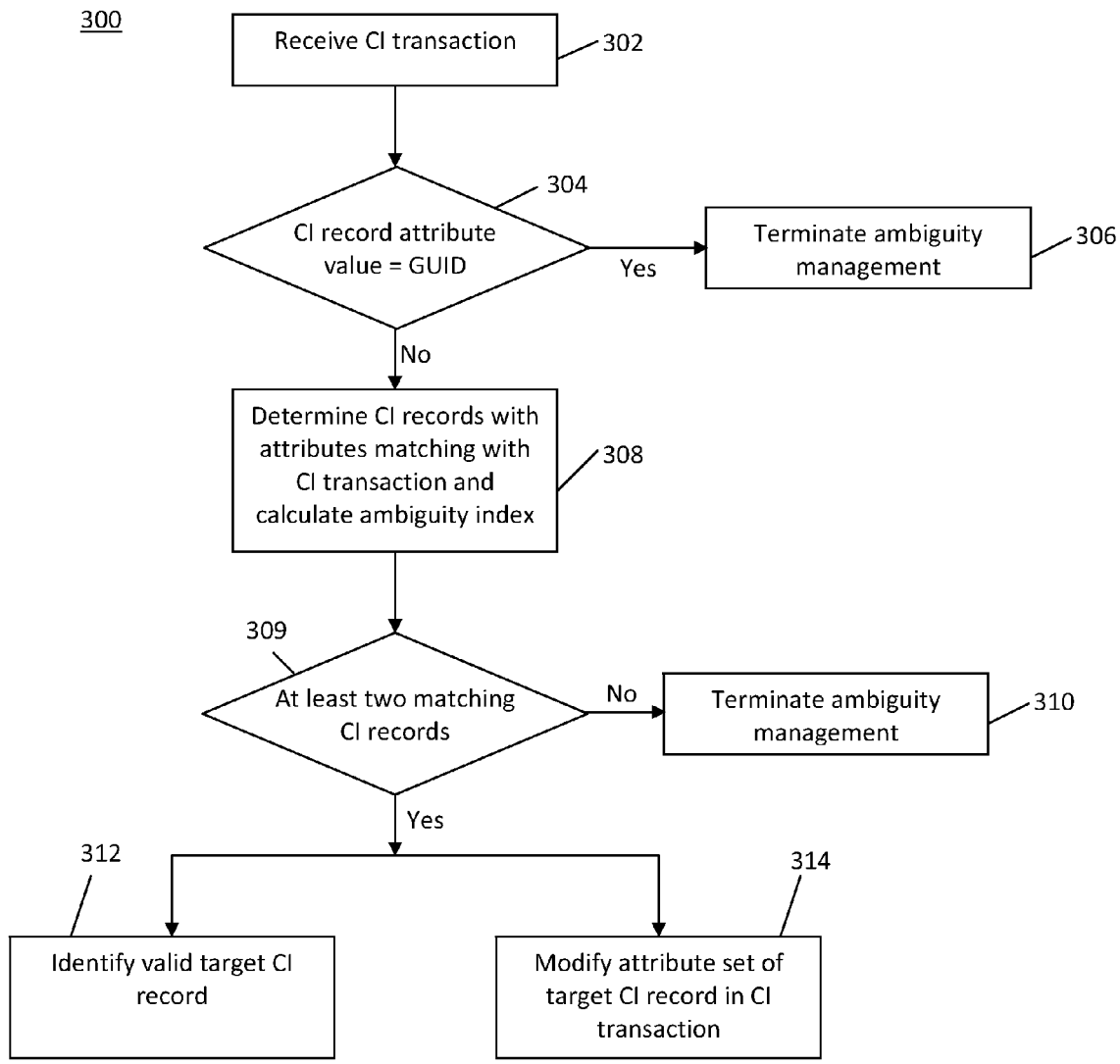
FIG. 3 illustrates an example of a method for managing ambiguity related to a configuration item transaction, according to various implementations of the invention.

In some implementations, the invention provides a method for managing ambiguity related to CI transactions (e.g., CI transactions 113) received at a database (e.g., database 110). FIG. 3 illustrates a process 300, which is an example of a process for managing ambiguity related to CI transactions 113. In some implementations, process 300 may be performed by one or more processors configured by computer executable instructions for performing a plurality of operations (e.g., the operations of process 300).

Process 300 includes an operation 302, in which a transaction for a target CI record (e.g., CI record 112) in a plurality of CI records is received at database 110. In an operation 304, identification module 124 may be invoked to determine if the received transaction specifies, indicates or is otherwise associated with a unique value, e.g., equal to a Global Unique Identifier (GUID). The presence of a GUID value in CI transaction 113 may indicate that the CI transaction is not ambiguous, and therefore can be excluded from the rest of the ambiguity management. In this case, process 300 may terminate for that CI transaction in an operation 306.

However, if identification module 124 does not determine a GUID value being present in the received CI transaction 113, ambiguity measuring module 122, in an operation 308, may be invoked to calculate ambiguity index for a CI transaction 113 by, for example, determining, for that CI transaction 113, if there are at least two CI records 112 in database 110 that match on any of the attributes associated with that CI transaction 113. Module 122 may further be invoked to determine the approximate number of CI records 112 that satisfy the attribute-matching criterion discussed above and assign those CI records to the ambiguity set of CI transaction 113. If it is determined, in an operation 309, that there are less than two (i.e., none or only one) CI records that satisfy the criterion, it may be concluded that CI transaction 113 is not ambiguous and, in an operation 310, process 300 may terminate for that CI transaction 113.

In an operation 312, responsive to the determination of the at least two configuration items in operation 309, identification module 124 may be invoked to identify a valid target CI record from the ambiguity set of CI transaction 113 for which CI transaction 113 is actually intended. Such identification may resolve any ambiguity related to CI transaction 113. The identification of the valid target CI record may be performed irrespective of any attribute type or value associated with CI transaction 113. In some implementations, the identification may be achieved by using the GUID value of the target CI record 112. In some implementations, valid target CI record may be different than target CI record of CI transaction 113. However, CI transaction 113 may be applied and executed for the valid target CI record.

In an operation 314, also following operation 304, AM module 128 may be invoked to modify the set of one or more attributes associated with the target CI record specified in the ambiguous CI transaction 113. In some implementations, modifying the set of attributes associated with the ambiguous CI transaction may include one or both of modifying a value of at least one attribute in the set of attributes, or adding a new attribute to the set of one or more attributes. These modifications may clarify and resolve the ambiguity in CI transaction 113 such that the correct target CI record for CI transaction 113 is clearly identifiable, thereby directing CI transaction 113 to the correct CI record.

In some implementations, Ambiguity Measuring Module 122 may be configured to distribute notifications to all interested parties of the ambiguous CI or the transaction, based on CI selection criteria including, but not limited to, CI identifying attributes, CI transaction source or information related to CI ownership. Moreover, in some implementations, the ambiguity index may be used as an input to graphs and/or reports related to performance of a CMDB. Accordingly, the ambiguity index may be used as a key performance indicator (KPI) for the health of a CMDB and its associated datacenter(s).

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any implementation can be combined with one or more features of any other implementation.

What is claimed is:

1. A method comprising:
    identifying, by one or more processors executing an ambiguity management application, for a first configuration item of a plurality of configuration items, one or more second configuration items of the plurality of configuration items, the first configuration item associated with a first set of one or more attributes and each of the one or more second configuration items associated with a corresponding second set of one or more attributes, wherein the first set of one or more attributes and each of the one or more second sets of one or more attributes have at least one attribute with an identical value, wherein each of the plurality of configuration items electronically represents properties of computer hardware and/or properties of computer software, and the properties of the computer hardware and/or the computer software are electronically discovered in a network by a computer discovery agent, and wherein attributes of one or more of the plurality of configuration items comprise a name, a serial number, a MAC address, an IP address, a system name, or a DNS name;
    determining an index, for the first configuration item, wherein a value of the index is calculated based on a sum of a number of attributes associated with the one or more second configuration items, that each have an identical value as that of a corresponding attribute in the first set of one or more attributes; and
    responsive to the index having a value corresponding to a non-zero number of the attributes that each have an identical value, causing, by one or more processors, (i) modification of an operational state of the first configuration item, the one or more second configuration items, or the first and one or more second configuration items, (ii) modification of a set of one or more attributes associated with the first configuration item, the one or more second configuration items, or the first and one or more second configuration items, (iii) or both (i) and (ii), wherein the value of the index is calculated based on a weighted sum of the number of attributes associated with the one or more second configuration items, that each have an identical value as that of a corresponding attribute in the first set of one or more attributes.

2. The method of claim 1, wherein another value of the index is calculated based on a total number of the one or more second configuration items.

3. The method of claim 1, comprising causing, by the processor, modification of the operational state of the first configuration item, the one or more second configuration items, or the first and one or more second configuration items, and wherein modification of the operational state of the first configuration item, the one or more second configuration items, or the first and one or more second configuration items comprises:

excluding the first configuration item, the one or more second configuration items, or the first and one or more second configuration items from ambiguity management;

deactivating the first configuration item, the one or more second configuration items, or the first and one or more second configuration items such that no update is performed on the first configuration item, the one or more second configuration items, or the first and one or more second configuration items; or superseding the first configuration item, the one or more second configuration items, or the first and one or more second configuration items such that any update for the first configuration item, the one or more second configuration items, or the first and one or more second configuration items is redirected to a superseding configuration item, wherein the superseding configuration item is any one of the plurality of configuration items except the ambiguous configuration item.

4. The method of claim 1, comprising causing, by the processor, modification of the set of one or more attributes associated with the first configuration item, the one or more second configuration items, or the first and one or more second configuration items, and wherein modification of the set of one or more attributes associated with the first configuration item, the one or more second configuration items, or the first and one or more second configuration items comprises (a) modifying a value of an attribute in the first set of one or more attributes, the one or more second sets of one or more attributes, or the first and one or more second sets of one or more attributes, (b) adding a new attribute to the first set of one or more attributes, the one or more second sets of one or more attributes, or both the first and one or more second sets of one or more attributes, or (c) both (a) and (b).

5. The method of claim 1, further comprising: responsive to the index having a non-zero value, (d) identifying the first configuration item as an ambiguous configuration item, (e) identifying each of the one or more second configuration items as an ambiguous configuration item, or (f) identifying the first and one or more second configuration items as ambiguous configuration items, wherein each of (d), (e) and (f) comprises (g) comparing attributes of the first and second sets of one or more attributes, (h) comparing a time value of an update performed on the first configuration item with a time value of an update performed on the one or more second configuration item, or (i) both (g) and (h).

6. The method of claim 5, wherein comparing attributes of the first and second sets of one or more attributes comprises associating a higher priority to an attribute relative to another attribute in the one or more attributes.

7. The method of claim 1, wherein identifying the one or more second configuration items is performed periodically, or in response to an update of the first set of one or more attributes.

8. The method of claim 1, further comprising:
repeating, for each of a plurality of the first configuration items, the identifying the one or more second configuration items and determining the index; and
sorting the plurality of the first configuration items based on their respective indexes to generate a sorted list of the first configuration items, wherein the first configuration items are thereby managed in accordance with the sorted list.

9. The method of claim 8, wherein the sorting comprises arranging the plurality of the first configuration items in a decreasing order of their respective indexes.

10. A system comprising:
one or more processors configured to:
identify, for a first configuration item of a plurality of configuration items, one or more second configuration items of the plurality of configuration items, the first configuration item associated with a first set of one or more attributes and each of the one or more second configuration items associated with a corresponding second set of one or more attributes, wherein the first set of one or more attributes and each of the second sets of one or more attributes have at least one attribute with an identical value, wherein each of the plurality of configuration items electronically represents properties of computer hardware and/or properties of computer software, and the properties of the computer hardware and/or the computer software are electronically discovered in a network by a computer discovery agent, and wherein attributes of one or more of the plurality of configuration items comprise a name, a serial number, a MAC address, an IP address, a system name, or a DNS name;
determine an index, for the first configuration item, wherein a value of the index is calculated based on a total number of attributes associated with the one or more second configuration items, that each have an identical value as that of a corresponding attribute in the first set of one or more attributes; and
responsive to the index having a value corresponding to a non-zero number of the attributes that each have an identical value, cause (i) modification of an operational state of the first configuration item, the one or more second configuration items, or the first and one or more second configuration items, (ii) modification of a set of one or more attributes associated with the first configuration item, the one or more second configuration items, or the first and one or more second configuration items, (iii) or both (i) and (ii), wherein the value of the index is calculated based on a weighted sum of the number of attributes associated with the one or more second configuration items, that each have an identical value as that of a corresponding attribute in the first set of one or more attributes.

11. The system of claim 10, wherein another value of the index is calculated based on a total number of the one or more second configuration items.

12. The system of claim 10, wherein the processor is configured to cause modification of the operational state of the first configuration item, the one or more second configuration items, or the first and one or more second configuration items, and wherein modification of the operational state of the first configuration item, the one or more second configuration items, or the first and one or more second configuration items, the processor is further configured to:

exclude the first configuration item, the one or more second configuration items, or the first and one or more second configuration items from ambiguity management;

deactivate the first configuration item, the one or more second configuration items, or the first and one or more second configuration items such that no update is performed on the first configuration item, the one or more second configuration items, or the first and one or more second configuration items; or supersede the first configuration item, the one or more second configuration items, or the first and one or more second configuration items such that any update for the first configuration item, the one or more second configuration items, or the first and one or more second configuration items is redirected to a superseding configuration item, wherein the superseding configuration item is any one of the plurality of configuration items except the ambiguous configuration item.

13. The system of claim 10, wherein the processor is configured to cause modification of the set of one or more attributes associated with the first configuration item, the one or more second configuration items, or the first and one or more second configuration items, and wherein, to cause modification of the set of one or more attributes associated with the first configuration item, the one or more second configuration items, or the first and one or more second configuration items, the processor is further configured to (a) modify a value of an attribute in the first set of one or more attributes, in the one or more second sets of one or more attributes, or the first and one or more second sets of one or more attributes, (b) add a new attribute to the first set of one or more attributes, to the one or more second sets of one or more attributes, or both the first and one or more second sets of one or more attributes, or (c) both (a) and (b).

14. The system of claim 10, wherein responsive to the index having a non-zero value, the processor is further configured to:
(d) identify the first configuration item as an ambiguous configuration item, (e) identify each of the one or more second configuration items as an ambiguous configuration item, or (f) identify the first and one or more second configuration items as ambiguous configuration items,
wherein to perform each of (d), (e) and (f), the processor is further configured to (g) compare attributes of the first and second sets of one or more attributes, (h) compare a time value of an update performed on the first configuration item with a time value of an update performed on the one or more second configuration items, or (i) both (g) and (h).

15. The system of claim 14, wherein to compare attributes of the first and second sets of one or more attributes, the processor is further configured to associate a higher priority to an attribute relative to another attribute in the one or more attributes.

16. The system of claim 10, wherein the processor is configured to identify the one or more second configuration items periodically, or in response to an update of the first set of one or more attributes.

17. The system of claim 10, wherein the processor is configured to:
for each of a plurality of the first configuration items, identify the one or more second configuration items item and determine the index; and
sort the plurality of the first configuration items based on their respective indexes to generate a sorted list of the first configuration items, wherein the first configuration items are thereby managed in accordance with the sorted list.

18. The system of claim 17, wherein the sorted list comprises a listing of the first configuration items in a decreasing order of their indexes.

19. A computer program product comprising:
a non-transitory computer readable storage medium storing information, the stored information comprising:
instructions configured to cause one or more processors to identify, for a first configuration item of a plurality of configuration items, one or more second configuration items of the plurality of configuration items, the first configuration item associated with a first set of one or more attributes and each of the one or more second configuration items associated with a corresponding second set of one or more attributes, wherein the first set of one or more attributes and each of the second sets of one or more attributes have at least one attribute with an identical value, wherein each of the plurality of configuration items electronically represents properties of computer hardware and/or properties of computer software, and the properties of the computer hardware and/or the computer software are electronically discovered in a network by a computer discovery agent, and wherein attributes of one or more of the plurality of configuration items comprise a name, a serial number, a MAC address, an IP address, a system name, or a DNS name;
instructions configured to cause one or more processors to determine an index, for the first configuration item, wherein a value of the index is calculated based on a total number of attributes, associated with the one or more second configuration items, that each have an identical value as that of a corresponding attribute in the first set of one or more attributes; and
instructions configured to cause one or more processors to modify an operational state of the first configuration item, the one or more second configuration items, or the first and one or more second configuration items, (ii) modify of a set of one or more attributes associated with the first configuration item, the one or more second configuration items, or the first and one or more second configuration items, (iii) or both (i) and (ii), responsive to the index having a value corresponding to a non-zero number of the attributes that each have an identical value, wherein the value of the index is calculated based on a weighted sum of the number of attributes associated with the one or more second configuration items, that each have an identical value as that of a corresponding attribute in the first set of one or more attributes.

20. The computer program product of claim 19, the stored information further comprising instructions configured to cause a processor to determine an index, for the first configuration item, wherein another value of the index is calculated based on a total number of the one or more second configuration items.

21. The computer program product of claim 19, wherein the instructions are configured to cause the processor to modify the operational state of the first configuration item, the one or more second configuration items, or the first and one or more second configuration items, and wherein, to modify the operational state of the first configuration item, the one or more second configuration items, or the first and one or more second configuration items, the instructions are further configured to cause the processor to:
exclude the first configuration item, the one or more second configuration items, or the first and one or more second configuration items from ambiguity management;

deactivate the first configuration item, the one or more second configuration items, or the first and one or more second configuration items such that no update is performed on the first configuration item, the one or more second configuration items, or the first and one or more second configuration items; or supersede the first configuration item, the one or more second configuration items, or the first and one or more second configuration items such that any update for the first configuration item, the one or more second configuration items, or the first and one or more second configuration items is redirected to a superseding configuration item, wherein the superseding configuration item is any one of the plurality of configuration items except the ambiguous configuration item.

22. The computer program product of claim 19, wherein the instructions are configured to cause the processor to modify the set of one or more attributes associated with the first configuration item, the one or more second configuration items, or the first and one or more second configuration items, and wherein, to modify the set of one or more attributes associated with the first configuration item, the one or more second configuration items, or the first and one or more second configuration items, the instructions are further configured to cause the processor to: (a) modify a value of an attribute in the first set of one or more attributes, in the one or more second sets of one or more attributes, or the first and one or more second sets of one or more attributes, (b) add a new attribute to the first set of one or more attributes, to the one or more second sets of one or more attributes, or both the first and one or more second sets of one or more attributes, or (c) both (a) and (b).

23. The computer program product of claim 19, wherein responsive to the index having a non-zero value, the instructions are configured to cause the processor to:

(d) identify the first configuration item as an ambiguous configuration item, (e) identify each of the one or more second configuration items as an ambiguous configuration item, or (f) identify the first and one or more second configuration items as ambiguous configuration items, wherein to perform each of (d), (e) and (f), the instructions are further configured to cause the processor to: (g) compare attributes of the first and second sets of one or more attributes, (h) compare a time value of an update performed on the first configuration item with a time value of an update performed on the one or more second configuration items, or (i) both (g) and (h).

24. The computer program product of claim 23, wherein, to compare attributes of the first and second sets of one or more attributes, the instructions are further configured to cause the processor to associate a higher priority to an attribute relative to another attribute in the one or more attributes.

25. The computer program product of claim 19, further comprising instructions configured to cause the processor to identify the one or more second configuration items periodically, or in response to an update of the first set of one or more attributes.

26. The computer program product of claim 19, further comprising instructions configured to cause the processor to:

for each of a plurality of the first configuration items, identify one or more second configuration items and determine the index; and sort the plurality of the first configuration items based on their respective indexes to generate a sorted list of the first configuration items, wherein the first configuration items are thereby managed in accordance with the sorted list.

27. The computer program product of claim 26, wherein the sorted list comprises a listing of the first configuration items in a decreasing order of their indexes.

* * * * *